United States Patent
Yanase et al.

(10) Patent No.: US 9,291,085 B2
(45) Date of Patent: Mar. 22, 2016

(54) DEVICE AND METHOD FOR ESTIMATING IDEAL AIR-FUEL RATIO IN INTERNAL COMBUSTION ENGINE, METHOD OF ESTIMATING OXYGEN STORAGE CAPACITY OF CATALYST, INTERNAL COMBUSTION ENGINE DEVICE AND MOTORCYCLE INCORPORATING INTERNAL COMBUSTION ENGINE DEVICE

(71) Applicant: Kawasaki Jukogyo Kabushiki Kaisha, Kobe-shi, Hyogo (JP)

(72) Inventors: Daisuke Yanase, Kakogawa (JP); Junji Tamura, Kobe (JP); Kouzou Suzuki, Kobe (JP); Takashi Abe, Akashi (JP); Yoshinobu Mori, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 14/281,704

(22) Filed: May 19, 2014

(65) Prior Publication Data
US 2014/0338312 A1 Nov. 20, 2014

(30) Foreign Application Priority Data

May 20, 2013 (JP) .................................. 2013-105958

(51) Int. Cl.
| | |
|---|---|
| *F01N 3/00* | (2006.01) |
| *F01N 3/02* | (2006.01) |
| *F01N 3/10* | (2006.01) |
| *F01N 3/20* | (2006.01) |
| *F01N 11/00* | (2006.01) |
| *F02D 41/02* | (2006.01) |
| *F02D 41/14* | (2006.01) |

(52) U.S. Cl.
CPC .......... *F01N 11/007* (2013.01); *F02D 41/0295* (2013.01); *F02D 41/1441* (2013.01); *F02D 41/1454* (2013.01); *F02D 41/1456* (2013.01); *F02D 41/1474* (2013.01); *F01N 2430/06* (2013.01); *F01N 2550/02* (2013.01); *F01N2560/14* (2013.01); *F02D 2200/0816* (2013.01); *Y02T 10/47* (2013.01)

(58) Field of Classification Search
USPC ........................... 60/274, 277, 286, 295, 299
See application file for complete search history.

(56) References Cited

U.S. PATENT DOCUMENTS

| | | | |
|---|---|---|---|
| 2003/0213233 | A1 | 11/2003 | Uchida |
| 2010/0108046 | A1 | 5/2010 | Nakagawa et al. |

FOREIGN PATENT DOCUMENTS

| | | |
|---|---|---|
| EP | 1243769 A1 | 9/2002 |
| JP | 2012026306 A | 2/2012 |

OTHER PUBLICATIONS

European Patent Office, Extended European Search Report of European Patent Application No. 14168627.9, Aug. 11, 2014, 7 pages.

*Primary Examiner* — Audrey K Bradley
*Assistant Examiner* — Dapinder Singh
(74) *Attorney, Agent, or Firm* — Alleman Hall McCoy Russell & Tuttle LLP

(57) ABSTRACT

A method of estimating an ideal air-fuel ratio in an internal combustion engine, comprises receiving an output of an upstream air-fuel ratio sensor and an output of a downstream air-fuel ratio sensor, the upstream air-fuel ratio sensor being attached to an exhaust gas passage such that it is positioned upstream of a catalyst provided in the exhaust gas passage to purify an exhaust gas, the downstream air-fuel ratio sensor being attached to the exhaust gas passage such that it is positioned downstream of the catalyst; detecting a state in which the catalyst does not store or release oxygen based on the output of the downstream air-fuel ratio sensor; and deciding as an estimated ideal air-fuel ratio in the internal combustion engine an air-fuel ratio detected by the upstream air-fuel ratio sensor when the state in which the catalyst does not store or release oxygen is detected.

9 Claims, 5 Drawing Sheets

DEVICE AND METHOD FOR ESTIMATING IDEAL AIR-FUEL RATIO IN INTERNAL COMBUSTION ENGINE, METHOD OF ESTIMATING OXYGEN STORAGE CAPACITY OF CATALYST, INTERNAL COMBUSTION ENGINE DEVICE AND MOTORCYCLE INCORPORATING INTERNAL COMBUSTION ENGINE DEVICE

BACKGROUND OF THE INVENTION

1. Field of the Invention

The present invention relates to an internal combustion engine device in which a catalyst for purifying an exhaust gas is provided in an exhaust gas passage of an internal combustion engine, and which includes air-fuel ratio sensors attached to the exhaust gas passage such that the sensors are positioned upstream and downstream of the catalyst, respectively, etc.

2. Description of the Related Art

In general, an exhaust gas emitted from an internal combustion engine which combusts fuel contains harmful substances. In recent years, emission regulations have become increasingly strict. Because of this, a two-wheeled vehicle, a four-wheeled vehicle, and other vehicles are each provided with a catalyst for purifying the exhaust gas by removing the harmful substances through an oxidation reaction and a reduction reaction, in an intermediate portion of an exhaust gas passage. To allow the exhaust gas to be efficiently oxidated and reduced by the action of the catalyst, it is required that an air-fuel ratio be an ideal air-fuel ratio in which the fuel and air are completely combusted, and that there is no excess oxygen. For example, in a case where the fuel is gasoline, the ideal air-fuel ratio is 14.6.

Japanese Laid-Open Patent Application Publication No. 2012-026306 discloses that air-fuel ratio sensors are attached to an exhaust gas passage of an internal combustion engine such that the sensors are positioned upstream and downstream of a catalyst provided in the exhaust gas passage, respectively, and a maximum oxygen storage capacity of the catalyst is estimated with reference to output values of these sensors. In this estimation of the oxygen storage capacity, it is necessary to provide an air-fuel ratio in a state in which the catalyst does not store (occlude) or release oxygen. The output values of the sensors, corresponding to the ideal air-fuel ratio, are provided off-line.

SUMMARY OF THE INVENTION

However, in actual running of the internal combustion engine, there exists degradation of the catalyst which progresses over years, a change in output characteristics of the sensors, a variation of initial characteristics which occur among sensors, etc. For this reason, the output values of the sensors which are relied upon to indicate the ideal air-fuel ratio do not always correspond to the ideal air-fuel ratio. Therefore, the above stated conventional oxygen storage capacity estimating method of the catalyst has a problem in that if there is a difference between the actual ideal air-fuel ratio and the air-fuel ratio corresponding to the output values of the sensors which are set as the ideal air-fuel ratio, that difference will cause a difference in estimated oxygen storage capacity as well.

The present invention is directed to solving the above described problem, and an object of the present invention is to more accurately estimate the oxygen storage capacity of the catalyst according to a change in running state of the internal combustion engine.

According to an aspect of the present invention, there is provided a method of estimating an ideal air-fuel ratio in an internal combustion engine, comprising: receiving an output of an upstream air-fuel ratio sensor and an output of a downstream air-fuel ratio sensor, the upstream air-fuel ratio sensor being attached to an exhaust gas passage of the internal combustion engine such that the upstream air-fuel ratio sensor is positioned upstream of a catalyst provided in the exhaust gas passage to purify an exhaust gas generated in the internal combustion engine, the downstream air-fuel ratio sensor being attached to the exhaust gas passage such that the downstream air-fuel ratio sensor is positioned downstream of the catalyst; detecting a state in which the catalyst does not store or release oxygen based on the output of the downstream air-fuel ratio sensor; and deciding as an estimated ideal air-fuel ratio in the internal combustion engine an air-fuel ratio detected by the upstream air-fuel ratio sensor when the state in which the catalyst does not store or release oxygen is detected.

In accordance with this method, since the estimated value of the ideal air-fuel ratio decided according to an actual running state of the internal combustion engine can be used to estimate the oxygen storage capacity of the catalyst, instead of the ideal air-fuel ratio (fixed value) set off-line, accuracy of the estimation of the oxygen storage capacity can be improved as the conventional oxygen storage capacity estimating method. This method is effectively applicable to the air-fuel ratio control of the internal combustion engine or determination as to degradation of the catalyst, which is performed with reference to the oxygen storage capacity.

In some cases, depending on the degradation of the catalyst or the running state of the internal combustion engine, the ideal air-fuel ratio changes. The above stated term "state in which the catalyst does not store or release oxygen" may include a balanced state in which an oxygen storage capacity and an oxygen release capacity are substantially balanced. The state of the ideal air-fuel ratio is substantially the same as this balanced state.

The state in which the catalyst does not store or release oxygen may be detected by detecting a state in which the output of the downstream air-fuel ratio sensor is stably maintained at a value close to a value corresponding to an ideal air-fuel ratio with a passage of time. In accordance with this configuration, the optimal state of the catalyst can be reliably detected.

The upstream air-fuel ratio sensor may be a linear air-fuel ratio (A/F) sensor; and the downstream air-fuel ratio sensor may be an oxygen ($O_2$) sensor. The oxygen sensor typically has a better output characteristic in a case where the air-fuel ratio is close to the ideal air-fuel ratio than the linear A/F sensor does. Because of this, by placing the oxygen sensor downstream of the catalyst, it may detect the air-fuel ratio after the exhaust gas has been purified by the action of the catalyst.

According to another aspect of the present invention, there is provided a method of estimating an oxygen storage capacity of a catalyst comprising: estimating the oxygen storage capacity of the catalyst, based on the ideal air-fuel ratio estimated by the above method of estimating the ideal air-fuel ratio in the internal combustion engine.

According to another aspect of the present invention, there is provided an ideal air-fuel ratio estimating device comprising: a first air-fuel ratio sensor which is attached to an exhaust gas passage of an internal combustion engine such that the first air-fuel ratio sensor is positioned upstream of a catalyst provided in the exhaust gas passage, and outputs a value changing in proportion to a change in an air-fuel ratio of an air-fuel mixture of the internal combustion engine; a second air-fuel ratio sensor which is attached to the exhaust gas passage such that the second air-fuel ratio sensor is positioned downstream of the catalyst and outputs a value changing steeply when the air-fuel ratio of the air-fuel mixture is close to the ideal air-fuel ratio; and a control unit for estimating that the output value of the first air-fuel ratio sensor in a state in which the second air-fuel ratio sensor continues to output the value which is close to a value corresponding to the ideal air-fuel ratio, is an output value corresponding to the ideal air-fuel ratio.

The ideal air-fuel ratio estimating device may further comprise an air-fuel ratio adjusting unit for adjusting the air-fuel ratio; wherein the control unit may estimate the ideal air-fuel ratio in such a manner that the control unit controls the air-fuel ratio adjusting unit such that the output value of the second air-fuel ratio sensor reaches a value which is close to the value corresponding to the ideal air-fuel ratio, and decides as the output value corresponding to the ideal air-fuel ratio an average value of the output value of the first air-fuel ratio sensor in the state in which the second air-fuel ratio sensor continues to output the value which is close to the value corresponding to the ideal air-fuel ratio.

According to another aspect of the present invention, there is provided an internal combustion engine device comprising: an internal combustion engine; a catalyst provided in an exhaust gas passage of the internal combustion engine to purify an exhaust gas generated in the internal combustion engine; an upstream air-fuel ratio sensor attached to the exhaust gas passage such that the upstream air-fuel ratio sensor is positioned upstream of the catalyst; a downstream air-fuel ratio sensor attached to the exhaust gas passage such that the downstream air-fuel ratio sensor is positioned downstream of the catalyst; and a control unit which receives an output of the upstream air-fuel ratio sensor and an output of the downstream air-fuel ratio sensor, detects a state (optimal state) in which the catalyst does not store or release oxygen based on the output of the downstream air-fuel ratio sensor, and decides as an estimated ideal air-fuel ratio an air-fuel ratio detected by the upstream air-fuel ratio sensor when the state in which the catalyst does not store or release oxygen is detected.

The control unit may estimate an oxygen storage capacity of the catalyst based on the estimated ideal air-fuel ratio.

According to another aspect of the present invention, there is provided a motorcycle incorporating the above stated internal combustion engine device.

The above and further objects, features and advantages of the present invention will more fully be apparent from the following detailed description with accompanying drawings.

DETAILED DESCRIPTION OF THE PREFERRED EMBODIMENTS

Figure 1:
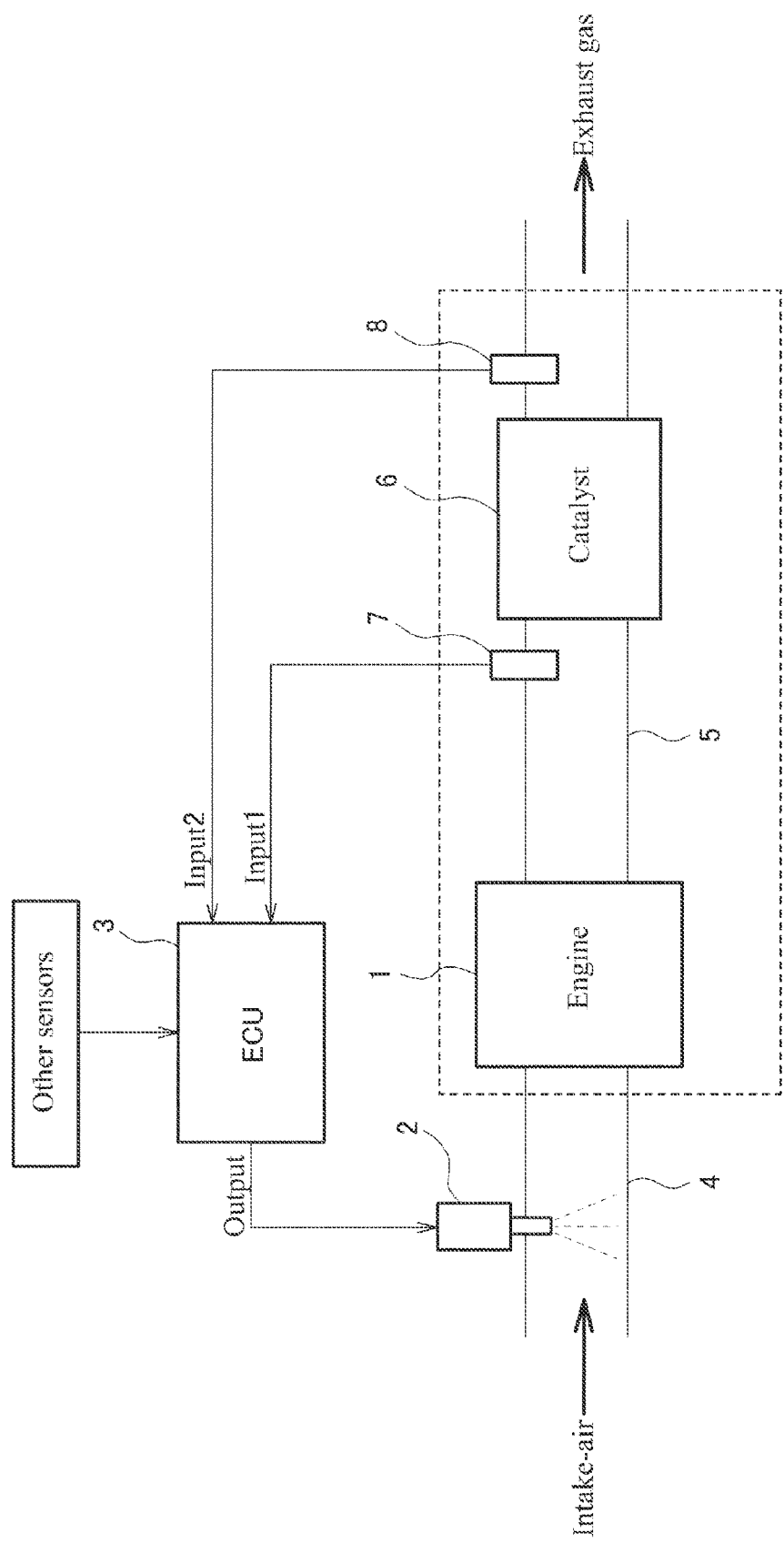
FIG. 1 is a block diagram showing an exemplary configuration of an internal combustion engine device according to an embodiment of the present invention.

Hereinafter, an embodiment of the present invention will be described with reference to the drawings. Throughout the drawings, the same or corresponding components are identified by the same reference numerals and will not be described in repetition.

(Embodiment)

Now, a description will be given of an example of an internal combustion engine device which uses an ideal air-fuel ratio estimating method and an oxygen storage capacity estimating method according to an embodiment of the present invention, with reference to the accompanied drawings.

FIG. 1 is a block diagram showing an exemplary configuration of the internal combustion engine device according to the embodiment of the present invention. As shown in FIG. 1, the internal combustion engine device includes an engine (internal combustion engine) 1, an injector (fuel injector) 2 for injecting fuel, an ECU (engine control unit) 3 for controlling the injector 2, an air-intake pipe 4 provided with the injector 2, an exhaust pipe (exhaust gas passage) 5 through which an exhaust gas emitted from the engine 1 flows, a catalyst 6 provided in the exhaust pipe 5 to purify the exhaust gas, an upstream air-fuel ratio sensor 7 attached to the exhaust pipe 5 such that it is positioned upstream of the catalyst 6 and a downstream air-fuel ratio sensor 8 attached to the exhaust pipe 5 such that it is positioned downstream of the catalyst 6.

In the present embodiment, the engine 1 is mounted in, for example, a motorcycle. However, a vehicle or the like in which the engine 1 may be mounted is not particularly limited. The motorcycle has a vehicle body and a catalyst capacity which are smaller than those of a four-wheeled vehicle. Therefore, in the motorcycle, a maximum oxygen storage (occlusion) capacity is limited, and hence the motorcycle is more likely to be affected by a difference in a result of estimation of the oxygen storage capacity. For this reason, there is a strong demand for accuracy of the estimation of the oxygen storage capacity in the motorcycle. In a case where the engine 1 is mounted in the motorcycle, the internal combustion engine device according to the present embodiment can be suitably used. Although a single-cylinder gasoline engine is exemplarily described as the engine 1 in the present embodiment, the engine 1 may be a multi-cylinder engine.

The injector 2 includes a fuel injection valve (e.g., fuel injection valve is constituted by an electromagnetic valve) connected to a pressurized fuel supply system (not shown). The injector 2 is configured to open the fuel injection valve in response to a fuel injection command provided by the ECU 3 to inject the fuel in a predetermined amount into the air-intake pipe 4.

The ECU 3 receives signals output from the upstream air-fuel ratio sensor 7, the downstream air-fuel ratio sensor 8 and other sensors, calculates a required fuel injection amount, and outputs to the injector 2 a fuel injection signal corresponding to the required fuel injection amount. In this way, the ECU 3 controls the fuel injection amount of the engine 1.

Any catalyst which is capable of purifying the exhaust gas may be used as the catalyst 6. Typically, the catalyst 6 is a three-way catalyst. The three-way catalyst is also called a catalyzer which purifies the exhaust gas by removing the harmful substances through an oxidation reaction and a reduction reaction. The three-way catalyst has, for example, a tubular honeycomb structure with many pore holes, and contains inside thereof, rare metal such as platinum, palladium, rhodium, iridium, etc. This makes it possible to remove from the exhaust gas, the harmful substances such as hydrocarbon (HC), carbon monoxide (CO), and a nitrogen oxide ($NO_x$), which are typically contained in the exhaust gas. Specifically, through the oxidation reaction or the reduction reaction, hydrocarbon is converted into water and carbon dioxide, carbon monoxide is converted into carbon dioxide, and a nitrogen compound is converted into nitrogen. To allow the exhaust gas to be efficiently oxidated and reduced by the action of the three-way catalyst, it is necessary to attain an ideal air-fuel ratio in which the fuel and air are completely combusted and there is no excess oxygen.

The upstream air-fuel ratio sensor 7 detects an oxygen component of the exhaust gas which is present at an upstream side of the catalyst 6 and outputs a detection signal to the ECU 3. In the present embodiment, the upstream air-fuel ratio sensor 7 is a linear A/F (air-fuel ratio) sensor having an output characteristic which is proportional to an air-fuel ratio of an air-fuel mixture. In the linear A/F sensor, its output value changes in proportion to a change in the air-fuel ratio of the air-fuel mixture. This makes it possible to easily detect an amount of a deviation of the air-fuel ratio from a predetermined air-fuel ratio (ideal air-fuel ratio) toward a lean air-fuel ratio or a rich air-fuel ratio. Any other sensor may be used as the upstream air-fuel ratio sensor 7 so long as it is able to detect the amount of the deviation of the air-fuel ratio from the ideal air-fuel ratio.

The downstream air-fuel ratio sensor 8 detects an oxygen component of the exhaust gas which is present at a downstream side of the catalyst 6 and outputs a detection signal to the ECU 3. In the present embodiment, the downstream air-fuel ratio sensor 8 is an $O_2$ (oxygen) sensor having a non-linear output characteristic with respect to the air-fuel ratio of the air-fuel mixture. The $O_2$ sensor has an output characteristic in which its output value changes steeply at a boundary between the rich air-fuel ratio in which the amount of the fuel is more than that in the ideal air-fuel ratio and the lean air-fuel ratio in which the amount of the fuel is less than that in the ideal air-fuel ratio. For example, when the output value of the $O_2$ sensor changes steeply in repetition within a predetermined time interval, it can be determined that the air-fuel ratio of the air-fuel mixture is close to the ideal air-fuel ratio. In this way, using the $O_2$ sensor, it can be determined that the air-fuel ratio of the air-fuel mixture is close to the ideal air-fuel ratio. In other words, by using the $O_2$ sensor, it becomes possible to determine the air-fuel ratio which is close to the air-fuel ratio in which three kinds of gases, i.e., HC, CO, and $NO_x$ contained in the exhaust gas are removed with a high rate by the action of the three-way catalyst. Thus, since the output value of the $O_2$ sensor changes steeply when the air-fuel ratio is close to the ideal air-fuel ratio, it is easy to detect whether or not the air-fuel ratio of the air-fuel mixture is close to the ideal air-fuel ratio, using the $O_2$ sensor, although it is difficult to detect a magnitude of the deviation from the ideal air-fuel ratio using the $O_2$ sensor. Any other sensor may be used as the downstream air-fuel ratio sensor 8 so long as its output value changes steeply when the air-fuel ratio is close to the ideal air-fuel ratio. In general, the $O_2$ sensor has a better output characteristic corresponding to the air-fuel ratio which is close to the ideal air-fuel ratio than the linear A/F sensor. In view of this, the $O_2$ sensor is preferably positioned downstream of the catalyst 6 and configured to detect the air-fuel ratio after the exhaust gas been purified by the action of the catalyst 6, as in the present embodiment. The upstream air-fuel ratio sensor 7 and the downstream air-fuel ratio sensor 8 are electrically connected to the ECU 3 together with sensors (not shown) such as a throttle sensor, an engine speed sensor, a vehicle speed sensor, an air-intake pressure sensor, a cooling water temperature sensor, and a cam position sensor.

Hereinafter the configuration of the ECU 3 will be described. In the description below, an adder, a subtracter, and an adder-subtracter will be collectively referred to as "adder-subtracter".

Figure 2:
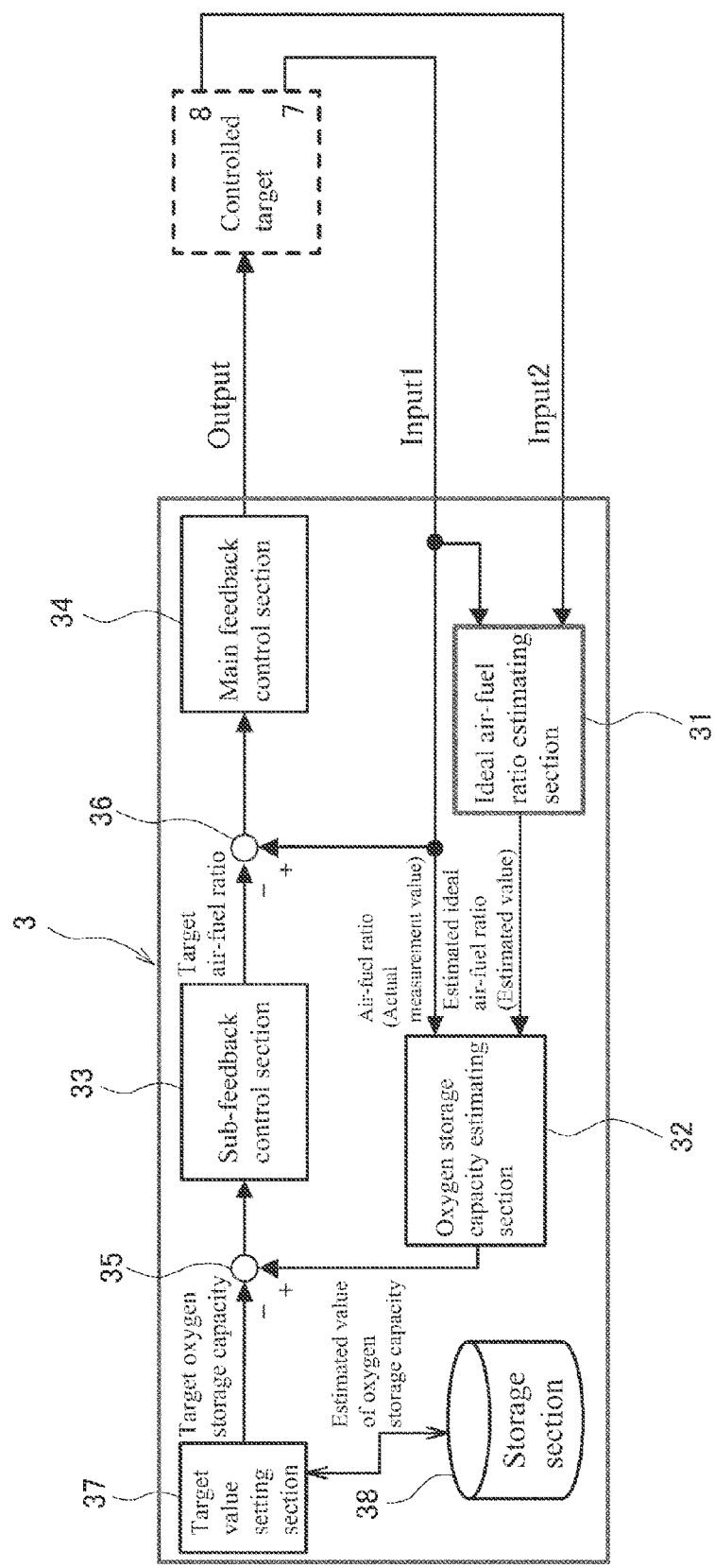
FIG. 2 is a block diagram showing an exemplary configuration of an engine control unit of FIG. 1.

FIG. 2 is a block diagram showing an exemplary configuration of the ECU 3 of FIG. 1. Referring to FIG. 2, the ECU 3 includes an ideal air-fuel ratio estimating section 31, an oxygen storage capacity estimating section 32, a sub-feedback control section 33, a main feedback control section 34, a target value setting section 37, and a storage section 38. The ECU 3 is configured as a processor unit such as a PLC (programmable logic controller) or a microcontroller. The ideal air-fuel ratio estimating section 31, the oxygen storage capacity estimating section 32, etc., are functional blocks implemented in such a way that the processor unit executes programs stored therein. The storage section 38 is constituted by an internal memory of the microcontroller, or the like.

The ideal air-fuel ratio estimating section 31 detects an optimal state of the catalyst 6 based on the output value of the downstream air-fuel ratio sensor 8, and decides as an estimated ideal air-fuel ratio, the output value of the upstream air-fuel ratio sensor 7 in a state in which the ideal air-fuel ratio estimating section 31 is detecting the optimal state. In the present embodiment, the ideal air-fuel ratio estimating section 31 calculates the estimated value of the ideal air-fuel ratio based on the output value of the upstream air-fuel ratio sensor 7 and the output value of the downstream air-fuel ratio sensor 8, and outputs the estimated value to the oxygen storage capacity estimating section 32. Preferably, in a state of shipping, the ideal air-fuel ratio estimating section 31 uses the sensor output value corresponding to the ideal air-fuel ratio found off-line, and then uses the sensor output value corresponding to the estimated ideal air-fuel ratio after the ideal air-fuel ratio is estimated. This makes it possible to lessen a deviation of the sensor output value corresponding to the ideal air-fuel ratio from an actual ideal air-fuel ratio for a period until the ideal air-fuel ratio is re-estimated after the engine 1 starts running.

The storage section 38 is configured to store the output value of the linear A/F sensor corresponding to the ideal air-fuel ratio which is found off-line in advance, the output value of the linear A/F sensor corresponding to the estimated ideal air-fuel ratio, the estimated oxygen storage capacity, etc., in addition to the oxygen storage capacity.

The oxygen storage capacity estimating section 32 estimates the oxygen storage capacity of the catalyst 6 based on the ideal air-fuel ratio estimated by the ideal air-fuel ratio estimating section 31. In the present embodiment, the oxygen storage capacity estimating section 32 estimates the oxygen storage capacity based on the output value of the upstream air-fuel ratio sensor 7 and the estimated value of the ideal air-fuel ratio, and outputs the estimated value to an adder-subtracter 35.

The target value setting section 37 reads the target oxygen storage capacity from the storage section 38, and outputs the target oxygen storage capacity to the adder-subtracter 35. In the present embodiment, the target oxygen storage capacity is set to, for example, an intermediate value between a saturated state value and a non-stored state value.

The adder-subtracter 35 outputs to the sub-feedback control section 33, a value derived by subtracting the target oxygen storage capacity from the estimated value of the oxygen storage capacity.

The sub-feedback control section 33 is configured to output the target air-fuel ratio corresponding to a deviation of the target oxygen storage capacity from the estimated value of the oxygen storage capacity.

An adder-subtracter 36 outputs to the main-feedback control section 34 a value derived by subtracting the output value of the sub-feedback control section 33 from the output value of the upstream air-fuel ratio sensor 7.

The main-feedback control section 34 calculates a fuel injection amount corresponding to a deviation of the air-fuel ratio corresponding to the output value of the upstream air-fuel ratio sensor 7 from the target air-fuel ratio output from the sub-feedback control section 33, and outputs a result of the calculation to the injector 2. A controlled target is the air-fuel ratio of the air-fuel mixture (gas suctioned into the engine 1) containing the fuel and the air.

In the present embodiment, the oxygen storage capacity is estimated based on the output value of the upstream air-fuel ratio sensor 7 positioned upstream of the catalyst 6, and the output value of the downstream air-fuel ratio sensor 8 positioned downstream of the catalyst 6, and the feedback control is performed such that the estimated value of the oxygen storage capacity converge at the target value. In this way, the catalyst 6 can efficiently remove the harmful substances from the exhaust gas.

Hereinafter, the air-fuel ratio control performed by the ECU 3 with reference to the oxygen storage capacity of the catalyst 6, using FIG. 3.

Figure 3:
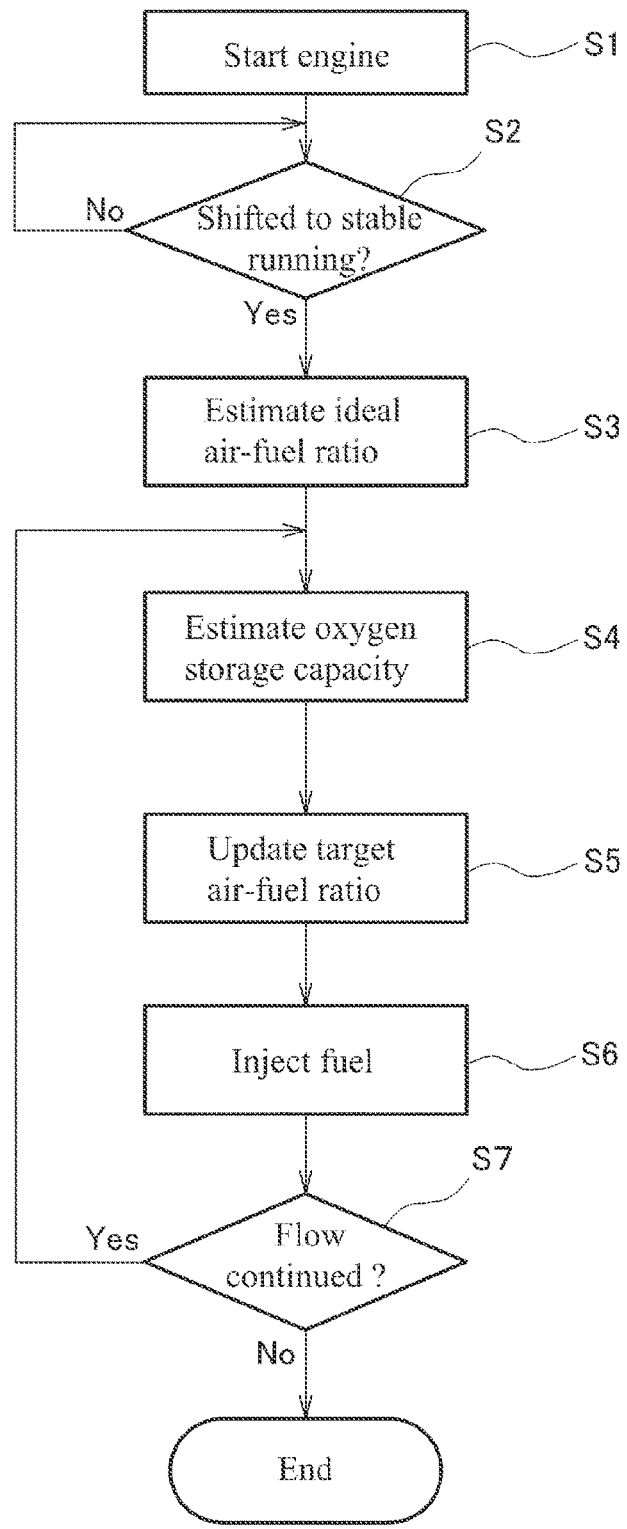
FIG. 3 is a flowchart showing a flow of air-fuel ratio control performed by the engine control unit of FIG. 2.

FIG. 3 is a flowchart showing a flow of the air-fuel ratio control in the ECU 3 of FIG. 2. In this air-fuel ratio control, an ideal air-fuel ratio estimating process and an oxygen storage capacity estimating process are performed according to the present embodiment. It is supposed that the ECU 3 performs the air-fuel ratio control in each constant control cycle.

Initially, the ECU 3 detects the rider's operation and starts the engine 1 (step S1). Then, the ECU 3 receives the output values of the upstream air-fuel ratio sensor 7, the downstream air-fuel ratio sensor 8, and the sensors (not shown) such as the throttle sensor and the engine speed sensor.

Then, the ECU 3 determines whether or not the engine 1 has shifted to stable running (step S2). The ECU 3 determines that the engine 1 has shifted to stable running, for example, when the throttle operation is stabilized, and thereby a throttle valve opening degree and an engine speed become constant. In the present embodiment, the term "stable running" may be referred to as a running state in which an engine driving power output does not change significantly, for example, during constant-speed driving, idling, acceleration, deceleration, etc. The ECU 3 may determine whether or not the engine 1 has shifted to stable running, based on a predetermined catalyst priority condition.

Figure 4:
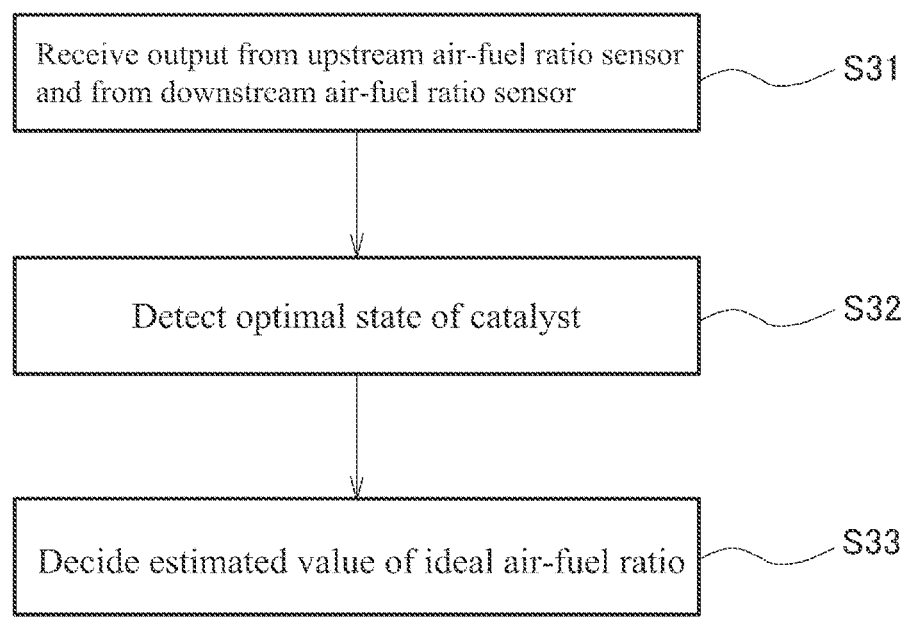
FIG. 4 is a flowchart showing an ideal air-fuel ratio estimating process in the air-fuel ratio control of FIG. 3.

When the ECU 3 determines that the engine 1 has shifted to stable running (YES in step S2), the ideal air-fuel ratio estimating section 31 calculates the estimated value of the ideal air-fuel ratio based on the output value of the upstream air-fuel ratio sensor 7 and the output value of the downstream air-fuel ratio sensor 8 (step S3). Hereinafter, the ideal air-fuel ratio estimating method according to the present embodiment will be described specifically using the flowchart of FIG. 4 and the graph of FIG. 5.

Figure 5A:
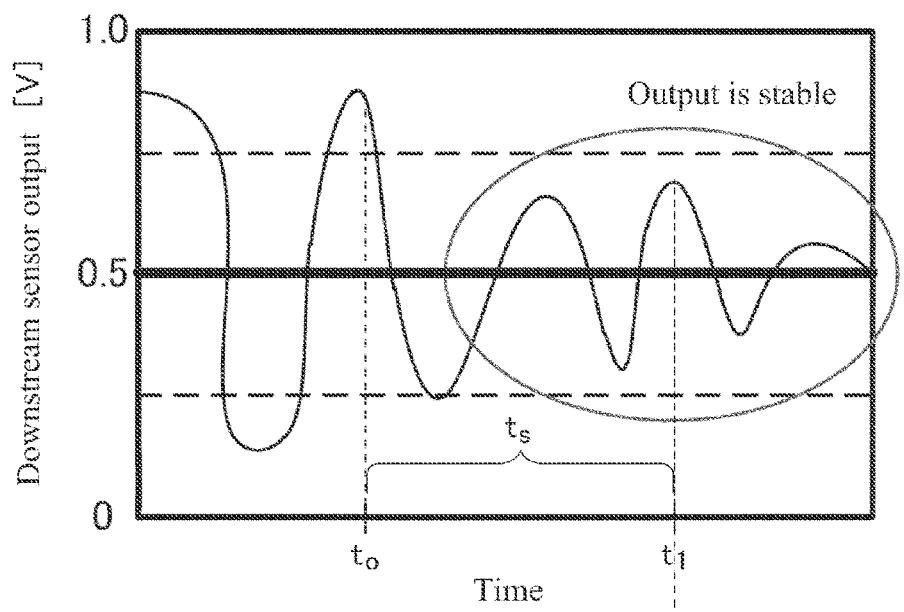
FIG. 5A is a graph showing the output of a downstream air-fuel ratio sensor in an ideal air-fuel ratio estimating method according to the embodiment.
Figure 5B:
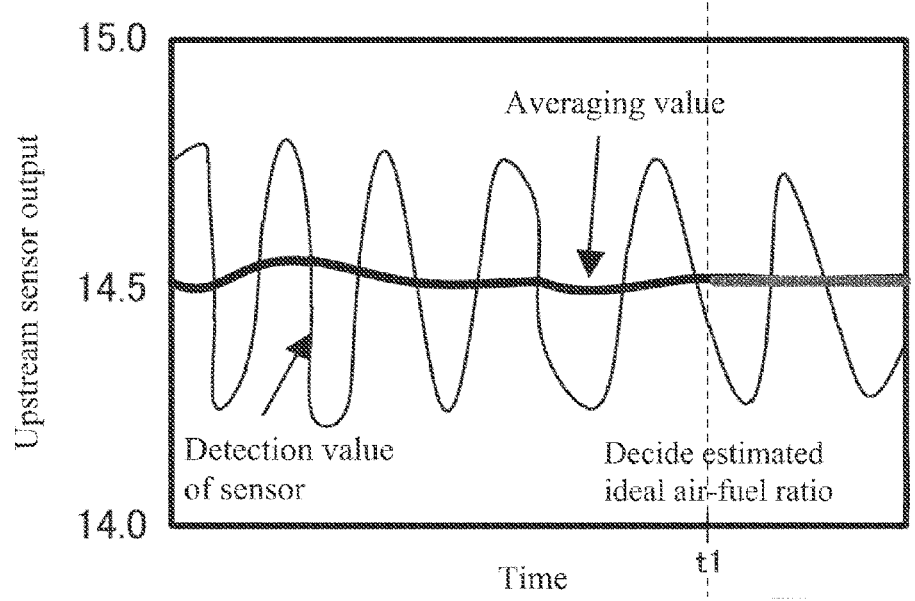
FIG. 5B is a graph showing the output of an upstream air-fuel ratio sensor in the ideal air-fuel ratio estimating method according to the embodiment.

FIG. 5A is a graph showing the output of the downstream air-fuel ratio sensor 8 in the ideal air-fuel ratio estimating method according to the present embodiment. FIG. 5A shows a change in the output of the downstream air-fuel ratio sensor 8, which occurs with time. FIG. 5B is a graph showing the output of the upstream air-fuel ratio sensor 7 in the ideal air-fuel ratio estimating method according to the present embodiment. FIG. 5B shows a change in the output of the upstream air-fuel ratio sensor 7, which occurs with time.

Initially, the ideal air-fuel ratio estimating section 31 receives the output value of the upstream air-fuel ratio sensor 7 and the output value of the downstream air-fuel ratio sensor 8 (step S31).

Then, the ideal air-fuel ratio estimating section 31 detects the optimal state of the catalyst 6 based on the output value of the downstream air-fuel ratio sensor 8. In the present embodiment, the ideal air-fuel ratio estimating section 31 detects the optimal state by detecting a state in which the output value of the downstream air-fuel ratio sensor 8 is stably maintained at a value which is close to the value corresponding to the ideal air-fuel ratio with a passage of time (step S32). Specifically, the detection condition is, as shown in FIG. 5A, such that the amplitude of the output value of the downstream air-fuel ratio sensor 8 continues to fall within a specified range (0.3 to 0.7V) near a specified value (0.5V) for a specified time $t_s$ (several seconds). When this detection condition is satisfied, the ECU 3 determines that the air-fuel ratio converges at a value close to the ideal air-fuel ratio, in a region which is downstream of the catalyst 6. In the present embodiment, 0.5V is preset as the specified value so as to correspond to the ideal air-fuel ratio.

Then, the ideal air-fuel ratio estimating section 31 decides as the estimated ideal air-fuel ratio in the engine 1, the air-fuel ratio detected by the upstream air-fuel ratio sensor 7 in a state in which the ideal air-fuel ratio estimating section 31 is detecting the optimal state (step S33). In the present embodiment, the ideal air-fuel ratio estimating section 31 calculates an averaging value (bold line) of the output value of the upstream air-fuel ratio sensor 7 at time $t_1$ when the output value of the downstream air-fuel ratio sensor 8 is stabilized and the ideal air-fuel ratio estimating section 31 is detecting the optimal state of the catalyst 6, and decides this as the estimated value of the ideal air-fuel ratio. Since the estimated value of the ideal air-fuel ratio decided according to the actual running state of the engine 1 is used to estimate the oxygen storage capacity of the catalyst 6, instead of the ideal air-fuel ratio (fixed value), accuracy of the estimation of the ideal air-fuel mixture is improved as compared to the conventional estimation method of the oxygen storage capacity.

Then, the oxygen storage capacity estimating section 32 estimates the oxygen storage capacity of the catalyst 6 based on the estimated ideal air-fuel ratio (step S4). In the present embodiment, the oxygen storage capacity estimating section 32 compares the output value of the upstream air-fuel ratio sensor 7 to the estimated value of the ideal air-fuel ratio and calculates an instantaneous value of the oxygen storage capacity and an instantaneous value of an oxygen release capacity. Then, the oxygen storage capacity estimating section 32 integrates the instantaneous value of the oxygen storage capacity and the instantaneous value of the oxygen release capacity to obtain an integrated value of the oxygen storage capacity, and decides this as the estimated value of the oxygen storage capacity. The oxygen storage capacity estimating section 32 updates the oxygen storage capacity stored in the storage section 38. The estimated value of the oxygen storage capacity is used to control the oxygen storage capacity.

Then, the sub-feedback control section 33 outputs the target air-fuel ratio corresponding to a deviation of the estimated value of the oxygen storage capacity from the target oxygen storage capacity. At this time, the target air-fuel ratio in the air-fuel ratio control is updated (step S5).

Then, the main-feedback control section 34 outputs to the controlled target (injector 2), the fuel injection amount corresponding to the deviation of the air-fuel ratio corresponding to the output value of the upstream air-fuel ratio sensor 7 from the target air-fuel ratio, based on the output of the sub-feedback control section 33 (step S6). The injector 2 injects the fuel with this fuel injection amount into the air-intake pipe 4.

Then, the ECU 3 determines whether or not to continue the flow of the air-fuel ratio control after the injector 2 injects the fuel (step S7). For example, when the ECU 3 determines that a termination condition of the air-fuel ratio control based on the oxygen storage capacity is satisfied, for example, because the rider of the motorcycle performs an operation for accelerating or decelerating the motorcycle, it terminates the air-fuel ratio control. On the other hand, when the ECU 3 determines that the stable running continues, it returns to step S4. In the above described manner, the ECU 3 performs the ideal air-fuel ratio estimating process and the oxygen storage capacity estimating process according to the present embodiment, and performs the air-fuel ratio control for the engine 1 with reference to the oxygen storage capacity.

The ideal air-fuel ratio estimating process may be performed at least once every time the engine 1 starts, as in the present embodiment. When the engine 1 is stopped, the estimated value may be stored in the storage section 38. Then, when the engine 1 starts, the estimated value of the ideal air-fuel ratio stored in the storage section 38 may be used in the oxygen storage capacity estimating process.

As shown in the block diagram of FIG. 2, the air-fuel ratio control in the present embodiment is to control the air-fuel ratio such that the oxygen storage capacity converges at the target oxygen storage capacity. By setting the target oxygen storage capacity to the intermediate value between the saturated state value and the non-stored state value, the catalytic ability of the catalyst 6 can be effectively utilized Although in the present embodiment, the air-fuel ratio control in the state (stable running) in which a great engine driving power output is not demanded has been described, the present invention is not limited to this. In an engine driving power output priority state in which a great engine driving power output is demanded, for example, during acceleration or starting, the ECU 3 executes a program which is different from that of the present embodiment to control the air-fuel ratio so that the rich air-fuel ratio is attained.

Although in the present embodiment, the detection condition of the optimal state is such that the amplitude of the output value of the downstream air-fuel ratio sensor 8 continues to fall within the specified range for the specified time, another detection condition may be used. For example, the detection condition may be such that the output value of the downstream air-fuel ratio sensor 8 becomes a specified value a predetermined number of times or more repeatedly within a specified time. Or, the detection condition may be such that the output value of the downstream air-fuel ratio sensor 8 crosses a specified value within a specified time. To detect the optimal state, in step S3 of FIG. 3, the fuel injection amount may be feedback-controlled assuming that the specified value of the output of the downstream air-fuel ratio sensor 8, corresponding to the ideal air-fuel ratio is the target value. The feedback control allows the output of the downstream air-fuel ratio sensor 8 to positively become close to the optimal state. In the graph of FIG. 5A, the output value of the downstream air-fuel ratio sensor 8 is close to 1V in the rich air-fuel ratio, while the output value of the downstream air-fuel ratio sensor 8 is close to 0V in the lean air-fuel ratio. On the other hand, when the air-fuel ratio changes from the lean air-fuel ratio and comes close to the rich air-fuel ratio, the output value of the downstream air-fuel ratio sensor 8 changes steeply from a value close to 0V to a value close to 1V, in approximately the ideal air-fuel ratio.

Although in the present embodiment, the estimated value of the ideal air-fuel ratio is the averaging value at time $t_1$ when the ideal air-fuel ratio estimating section 31 is detecting the optimal state, another calculation value may be used as the estimated value of the ideal air-fuel ratio. For example, an average value of the output value of the upstream air-fuel ratio sensor 7 from time $t_0$ to time $t_1$ may be used as the estimated value of the ideal air-fuel ratio. Or, an average value of the output value of the upstream air-fuel ratio sensor 7 for a period from $t_1$ until time which is away from $t_1$ may be used as the estimated value of the ideal air-fuel ratio. By using the averaging value or the average value as described above, the estimated value of the ideal air-fuel ratio can be obtained more accurately.

The oxygen storage capacity of the catalyst 6 of the present invention may be estimated by a known method. For example, in a state in which oxygen is completely released from the catalyst 6, when the output value of the upstream air-fuel ratio sensor 7 corresponds to the lean air-fuel ratio, the oxygen storage capacity increases, whereas when the output value of the upstream air-fuel ratio sensor 7 corresponds to the rich air-fuel ratio, the oxygen is released from the catalyst 6 and the oxygen storage capacity decreases. Specifically, the oxygen storage capacity is estimated by adding an initial value of the oxygen storage capacity of the catalyst 6 to an integrated value of the deviation (instantaneous value of the oxygen storage capacity) of the air-fuel ratio corresponding to the output value of the upstream air-fuel ratio sensor 7 from the ideal air-fuel ratio. The initial value of the oxygen storage capacity may be reset when a predetermined condition is satisfied. Or, in a case where the estimating operation of the oxygen storage capacity is repeated after the reset, the value of the oxygen storage capacity which is estimated most recently before the reset may be used as the initial value of the oxygen storage capacity. Since the oxygen storage capacity is derived using the integrated value, an error of the oxygen storage capacity increases with a passage of time if a deviation of the ideal air-fuel ratio occurs. In the present invention, since the actual ideal air-fuel ratio can be derived accurately, an accumulated error in deriving of the oxygen storage capacity is lessened, and as a result, the air-fuel ratio control can be performed accurately.

The present embodiment can address a case where the output characteristic is varied from A/F sensor to A/F sensor, or where there is a degradation of the A/F sensor which progresses over years. The present invention is especially applicable to the motorcycle in which the catalyst capacity is small, and the motorcycle is more likely to be affected by a deviation of a control point in the air-fuel ratio control which is caused by a change in the output characteristic of the A/F sensor. In the motorcycle in which the engine 1 is frequently run under rich (excess fuel) conditions, the catalyst ability of the catalyst 6 can be utilized most effectively, by performing the air-fuel ratio control using the oxygen storage capacity. In this way, the catalyst can be reduced in size while maintaining a purification effect.

Although in the present embodiment, the ideal air-fuel ratio is estimated every time the engine 1 shifts to stable running, the present invention is not limited to this. For example, the estimating operation of the ideal air-fuel ratio may be performed if a predetermined condition is satisfied. For example, the time when the fuel will be changed may be determined, and the ideal air-fuel ratio may be estimated every time the fuel is changed. This makes it possible to set the ideal air-fuel ratio accurately every time fuel with a different ideal air-fuel ratio is fed to the injector 2. For example, the predetermined condition may include a condition in which the temperature of the catalyst increases up to a predetermined temperature or higher.

Although in the present embodiment, the air-fuel ratio control is performed based on the oxygen storage capacity, it may also be performed without being based on the oxygen storage capacity. For example, the air-fuel ratio control may be performed so that the output value of the upstream air-fuel ratio sensor 7 reaches the value corresponding to the estimated ideal air-fuel ratio.

In accordance with the present embodiment, the estimation of the oxygen storage capacity and the air-fuel ratio control can be performed without using the ideal air-fuel ratio (fixed value). Therefore, the fuel of the engine is not limited to gasoline, but may be ethanol, or blended fuel of gasoline and ethanol.

Although in the present embodiment, the estimated value of the ideal air-fuel ratio is used to estimate the oxygen storage capacity, it may be used only in the estimation of the ideal air-fuel ratio without estimating the oxygen storage capacity. In other words, the fuel injection corresponding to the oxygen storage capacity may not be performed but the estimated value of the ideal air-fuel ratio may be used in the control in which the fuel is injected so that the ideal air-fuel ratio is attained. For example, in a case where the blended fuel of gasoline and ethanol is used, the ideal air-fuel ratio changes according to a blending ratio. In accordance with the present invention, by estimating the ideal air-fuel ratio regularly during running of the engine 1, it becomes possible to avoid occurrence of a deviation between the ideal air-fuel ratio and the air-fuel ratio corresponding to the sensor output value which is set as the ideal air-fuel ratio.

Although in the present embodiment, the ideal air-fuel ratio estimating method and the oxygen storage capacity estimating method are applied to the air-fuel ratio control of the engine with reference to the oxygen storage capacity of the catalyst, the present invention is not limited to this. The ideal air-fuel ratio estimating method and the oxygen storage capacity estimating method may be applied to determine the degradation of the catalyst 6. In this case, also, accuracy of the estimation of the oxygen storage capacity is high, and therefore accuracy of the determination as to the degradation of the catalyst can be improved.

Although the ECU 3 controls the air-fuel ratio of the air-fuel mixture controlled in conjunction with the fuel injection amount, the present invention is not limited to this. Alternatively, the ECU 3 may control the air-fuel ratio of the air-fuel mixture by adjusting an air-intake amount by operating a throttle valve or the like, or control an oxygen concentration of the exhaust gas in conjunction with an amount of secondary air supplied by a secondary air supply device.

Although in the present embodiment, the ideal air-fuel ratio estimating section 31 calculates the averaging value of the output value of the upstream air-fuel ratio sensor 7 at time t1 when the output value of the downstream air-fuel ratio sensor 8 is determined as stable and decides this as the estimated value of the ideal air-fuel ratio, it may decide as the estimated value of the ideal air-fuel ratio, an average value of the output value of the upstream air-fuel ratio sensor 7 or an output value of a low-pass filter.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. A method executed by a controller in an internal combustion engine, comprising:
receiving an output of an upstream air-fuel ratio sensor and an output of a downstream air-fuel ratio sensor, the upstream air-fuel ratio sensor being attached to an exhaust gas passage of the internal combustion engine such that the upstream air-fuel ratio sensor is positioned upstream of a catalyst provided in the exhaust gas passage to purify an exhaust gas generated in the internal combustion engine, the downstream air-fuel ratio sensor being attached to the exhaust gas passage such that the downstream air-fuel ratio sensor is positioned downstream of the catalyst;
detecting a state in which the catalyst does not store or release oxygen based on the output of the downstream air-fuel ratio sensor;
deciding as an estimated ideal air-fuel ratio in the internal combustion engine an air-fuel ratio detected by the upstream air-fuel ratio sensor when the state in which the catalyst does not store or release oxygen is detected;
comparing a value of the output of the upstream air-fuel ratio sensor to a value of the estimated ideal air-fuel ratio, calculating an instantaneous value of the oxygen storage capacity and an instantaneous value of an oxygen release capacity, integrating the instantaneous value of the oxygen storage capacity and the instantaneous value of the oxygen release capacity to obtain an integrated value of the oxygen storage capacity, and deciding the integrated value as an estimated value of the oxygen storage capacity; and
operating the internal combustion engine to feedback-control an air-fuel ratio such that the estimated value of the oxygen storage capacity converges at a predetermined target oxygen storage capacity.

2. The method according to claim 1,
wherein the target oxygen storage capacity is set to an intermediate value between a saturated state value and a non-stored state value.

3. The method according to claim 1, further comprising:
controlling the air-fuel ratio such that the air-fuel ratio reaches a target air-fuel ratio corresponding to a deviation of the estimated value of the oxygen storage capacity with respect to the target oxygen storage capacity, and sequentially updating the target air-fuel ratio.

4. The method according to claim 3, comprising:
controlling a fuel injector of the internal combustion engine such that an amount of fuel injected by the fuel injector reaches a fuel injection amount corresponding to a deviation of an output value of an upstream air-fuel ratio sensor from the target air-fuel ratio.

5. An ideal air-fuel ratio estimating device comprising:
a first air-fuel ratio sensor which is attached to an exhaust gas passage of an internal combustion engine such that the first air-fuel ratio sensor is positioned upstream of a catalyst provided in the exhaust gas passage, and outputs a value changing in proportion to a change in an air-fuel ratio of an air-fuel mixture of the internal combustion engine;
a second air-fuel ratio sensor which is attached to the exhaust gas passage such that the second air-fuel ratio sensor is positioned downstream of the catalyst and outputs a value changing steeply when the air-fuel ratio of the air-fuel mixture is close to the ideal air-fuel ratio;

a controller for estimating that the output value of the first air-fuel ratio sensor in a state in which the second air-fuel ratio sensor continues to output the value which is close to a value corresponding to the ideal air-fuel ratio, is an output value corresponding to the ideal air-fuel ratio, comparing the value of the output of the first air-fuel ratio sensor to the value of the estimated ideal air-fuel ratio, calculating an instantaneous value of the oxygen storage capacity of the catalyst and an instantaneous value of an oxygen release capacity of the catalyst, integrating the instantaneous value of the oxygen storage capacity and the instantaneous value of the oxygen release capacity to obtain an integrated value of the oxygen storage capacity, and deciding the integrated value as an estimated value of the oxygen storage capacity; and operating the internal combustion engine to feedback-control an air-fuel ratio such that the estimated value of the oxygen storage capacity converges at a predetermined target oxygen storage capacity.

6. The ideal air-fuel ratio estimating device according to claim 5, wherein the controller estimates the ideal air-fuel ratio in such a manner that the controller adjusts the air-fuel ratio such that the output value of the second air-fuel ratio sensor reaches a value which is close to the value corresponding to the ideal air-fuel ratio, and decides as the output value corresponding to the ideal air-fuel ratio an average value of the output value of the first air-fuel ratio sensor in the state in which the second air-fuel ratio sensor continues to output the value which is close to the value corresponding to the ideal air-fuel ratio.

7. An internal combustion engine device comprising:
an internal combustion engine;
a catalyst provided in an exhaust gas passage of the internal combustion engine to purify an exhaust gas generated in the internal combustion engine;
an upstream air-fuel ratio sensor attached to the exhaust gas passage such that the upstream air-fuel ratio sensor is positioned upstream of the catalyst;
a downstream air-fuel ratio sensor attached to the exhaust gas passage such that the downstream air-fuel ratio sensor is positioned downstream of the catalyst;
a controller which receives an output of the upstream air-fuel ratio sensor and an output of the downstream air-fuel ratio sensor, detects a state in which the catalyst does not store or release oxygen based on the output of the downstream air-fuel ratio sensor, and decides as an estimated ideal air-fuel ratio an air-fuel ratio detected by the upstream air-fuel ratio sensor when the state in which the catalyst does not store or release oxygen is detected, wherein the controller compares a value of the output of the upstream air-fuel ratio sensor to a value of the estimated ideal air-fuel ratio, calculates an instantaneous value of the oxygen storage capacity and an instantaneous value of an oxygen release capacity, integrates the instantaneous value of the oxygen storage capacity and the instantaneous value of the oxygen release capacity to obtain an integrated value of the oxygen storage capacity, and decides the integrated value as an estimated value of the oxygen storage capacity; and wherein the controller operates the internal combustion engine to feedback-control an air-fuel ratio such that the estimated value of the oxygen storage capacity converges at a predetermined target oxygen storage capacity.

8. The internal combustion engine device according to claim 7, wherein the controller estimates an oxygen storage capacity of the catalyst based on the estimated ideal air-fuel ratio.

9. A motorcycle incorporating the internal combustion engine device according to claim 7.

* * * * *